United States Patent
Dhanekula et al.

(10) Patent No.: US 7,840,391 B2
(45) Date of Patent: Nov. 23, 2010

(54) MODEL-DIVERSITY TECHNIQUE FOR IMPROVED PROACTIVE FAULT MONITORING

(75) Inventors: Ramakrishna C. Dhanekula, San Diego, CA (US); Keith A. Whisnant, San Diego, CA (US); Kenny C. Gross, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 436 days.

(21) Appl. No.: 11/871,365

(22) Filed: Oct. 12, 2007

(65) Prior Publication Data

US 2009/0099821 A1 Apr. 16, 2009

(51) Int. Cl.
*G06F 17/50* (2006.01)
*G06F 11/00* (2006.01)

(52) U.S. Cl. ............................... 703/2; 703/5; 702/181; 706/21

(58) Field of Classification Search ................ 703/2, 703/5–7; 702/181; 714/E11.024; 706/21
See application file for complete search history.

(56) References Cited

U.S. PATENT DOCUMENTS 6,581,047 B1 * 6/2003 Raykhman et al. ............ 706/21
7,349,823 B2 * 3/2008 Whisnant et al. ............ 702/181

* cited by examiner

*Primary Examiner*—Thai Phan
(74) *Attorney, Agent, or Firm*—Park, Vaughan, Fleming & Dowler LLP; Steven E. Stupp

(57) ABSTRACT

A computer system to predict a value of a signal from a sensor schedule loads across a set of processor cores is described. During operation, the computer system generates N models to predict the value of the signal based on a set of quantized telemetry signals, where a given model produces a value of the signal using a subset of the set of quantized telemetry signals, and where the subset is selected from the set of quantized telemetry signals based on an objective criterion. Next, the computer system predicts the value of the signal by aggregating the values produced by the N models.

20 Claims, 7 Drawing Sheets

MODEL-DIVERSITY TECHNIQUE FOR IMPROVED PROACTIVE FAULT MONITORING

RELATED APPLICATION

This application is related to a pending U.S. patent application entitled, "Using a Genetic Technique to Optimize a Regression Model Used for Proactive Fault Monitoring," by inventors Keith A. Whisnant, Ramakrishna C. Dhanekula, and Kenny C. Gross, having Ser. No. 11/359,672, and filing date Feb. 22, 2006, and to a pending U.S. patent application entitled, "Mitigating Quantization Effects in Computer Telemetry Signals," by inventors Ramakrishna C. Dhanekula, Kenny C. Gross, and Keith A. Whisnant, having Ser. No. 11/656,736, and filing date Jan. 22, 2007. The above-listed applications are hereby incorporated by reference.

BACKGROUND

1. Field of the Invention

The present invention relates to techniques for proactively detecting impending problems in computer systems. More specifically, the present invention relates to a method and apparatus for mitigating quantization effects in telemetry signals while using the telemetry signals to detect impending problems in a computer system.

2. Related Art

Modern server computer systems are typically equipped with a significant number of hardware and software sensors which continuously monitor signals during the operation of the computer systems. Results from this monitoring process can be used to generate time series data for these signals, which can subsequently be analyzed (for example, using pattern-recognition techniques) to determine how a computer system is operating. One particularly useful application of this time series data is to perform real-time 'proactive fault monitoring' to identify leading indicators of component or system failures before the failures actually occur.

In many proactive-fault-monitoring applications, pattern-recognition techniques, such as those based on nonlinear kernel regression, are used to model the complex interactions among multivariate signal behaviors in the proactive fault monitoring. Using these techniques, a pattern-recognition model is first constructed during a training phase, where correlations among the multiple input signals are learned. In a subsequent monitoring phase, the pattern-recognition model is used to estimate the values of each input signal as a function of the other input signals. Significant deviations between the estimated values and measured values of the same signal are used to detect potential anomalies in the computer system under surveillance.

There are a number of criteria by which the performance of a model can be evaluated, including: (1) accuracy: ability of the model to correctly estimate the value of a signal in the absence of faults in the computer system; (2) robustness: ability of the model to maintain accuracy in the presence of signal disturbance (i.e., estimates should not track errors in a faulty signal); and (3) spillover: ability of the model to isolate a faulty signal (i.e., estimates of signal A should not be affected by a fault in signal B). Moreover, it is useful from a computational standpoint to minimize the number of input signals included in the model without compromising the performance of the model. This is because the computational cost for the pattern-recognition computations generally scales with the square of the number of input signals in the model.

Note that it is often useful to select an appropriate subset of signals from all the available input signals to be included in the pattern-recognition model. Moreover, pattern-recognition techniques typically attain high sensitivity by aggregating estimates from multiple models, each of which uses the same signals, but different time observations or samples. Unfortunately, conventional approaches for choosing an appropriate subset of signals and/or appropriate time samples for a pattern-recognition model have been primarily based on trial-and-error techniques in combination with rudimentary linear-correlation analysis, which are not sufficient to predict the nonlinear-correlation behaviors among the input signals. More significantly, there are often a large number of available signals in a computer system (e.g., greater than 1000 signals in a high-end server system). In these cases, computational cost can make it intractable to examine all possible combinations of these signals to determine the optimal subset to be included in a model using the conventional approaches.

Moreover, in some computer systems low-resolution analog-to-digital chips (e.g., 8-bit A/D chips) are used to convert analog telemetry signals (such as temperature, voltage, and current signals) into digital telemetry signals. These low-resolution A/D chips often generate digitized telemetry signals that are severely quantized, which means that values for the quantized telemetry signals are reported using only a few 'quantization levels.' Unfortunately, pattern-recognition techniques typically cannot be applied to such low-resolution quantized telemetry signals.

One solution to this problem is to use higher-resolution A/D chips. For example, a 12-bit A/D chip provides 16-times more quantization levels than an 8-bit A/D chip. Unfortunately, such higher-resolution A/D chips are expensive, and retrofitting legacy systems that contain low-resolution A/D chips with such higher-resolution A/D chips is impractical.

Hence, what is needed is a computationally efficient technique for generating models from quantized telemetry signals for use in proactive fault monitoring without the problems described above.

SUMMARY

One embodiment of the present invention provides a computer system that predicts a value of a signal from a sensor. During operation, the computer system generates N models to predict the value of the signal based on a set of quantized telemetry signals, where a given model produces a value of the signal using a subset of the set of quantized telemetry signals, and where the subset is selected from the set of quantized telemetry signals based on an objective criterion. Next, the computer system predicts the value of the signal by aggregating the values produced by the N models.

In some embodiments, the objective criterion accounts for: a robustness of the predicted value when degradation occurs in one or more sensors in the subset; spillover, which determines how much a disturbance on a given signal included in the subset of the quantized telemetry signals used in the given model affects the predicted value of the signal; and/or an error between the predicted value and an actual value of the signal. For example, the error may include a mean-square error.

In some embodiments, the objective criterion includes cross-correlation coefficients between the quantized telemetry signals.

In some embodiments, the aggregating of the values includes averaging the values. Moreover, during the averaging, the values may be weighted based on the variance of the values. For example, the weighting may be determined using a Kalman filter.

In some embodiments, generating the given model includes initializing a pool of candidate models which include at least two candidate models, where each candidate model in the pool includes a subset of the set of quantized telemetry signals. Moreover, the given model may be optimized by iteratively: selecting two models U and V from the pool of candidate models, where models U and V best predict the signal based on training data in the set of quantized telemetry signals and the objective criterion; using a genetic technique to create an offspring model W from U and V by combining parts of the two models U and V; and adding W to the pool of candidate models.

In some embodiments, each candidate model in the pool is represented using an n-bit binary string. Moreover, creating the offspring model W from U and V may involve: selecting a crossover point k, where k is an integer between 1 and n; creating W by combining U and V such that the first k bits of W are the first k bits of U, and the last (n–k) bits of W are the last (n–k) bits of V; and reversing one bit within W with a predetermined probability p. Note that k may be randomly or pseudo-randomly selected.

In some embodiments, the computer system uses the estimated value to predict faults in a given computer system (which can be the computer system or can be another computer system) prior to failure of the given computer system.

In some embodiments, the computer system monitors a set of sensors to obtain the quantized telemetry signals.

Another embodiment provides a method including at least some of the above-described operations.

Another embodiment provides a computer program product for use in conjunction with the computer system.

BRIEF DESCRIPTION OF THE FIGURES

Note that like reference numerals refer to corresponding parts throughout the drawings.

DETAILED DESCRIPTION

Figure 1:
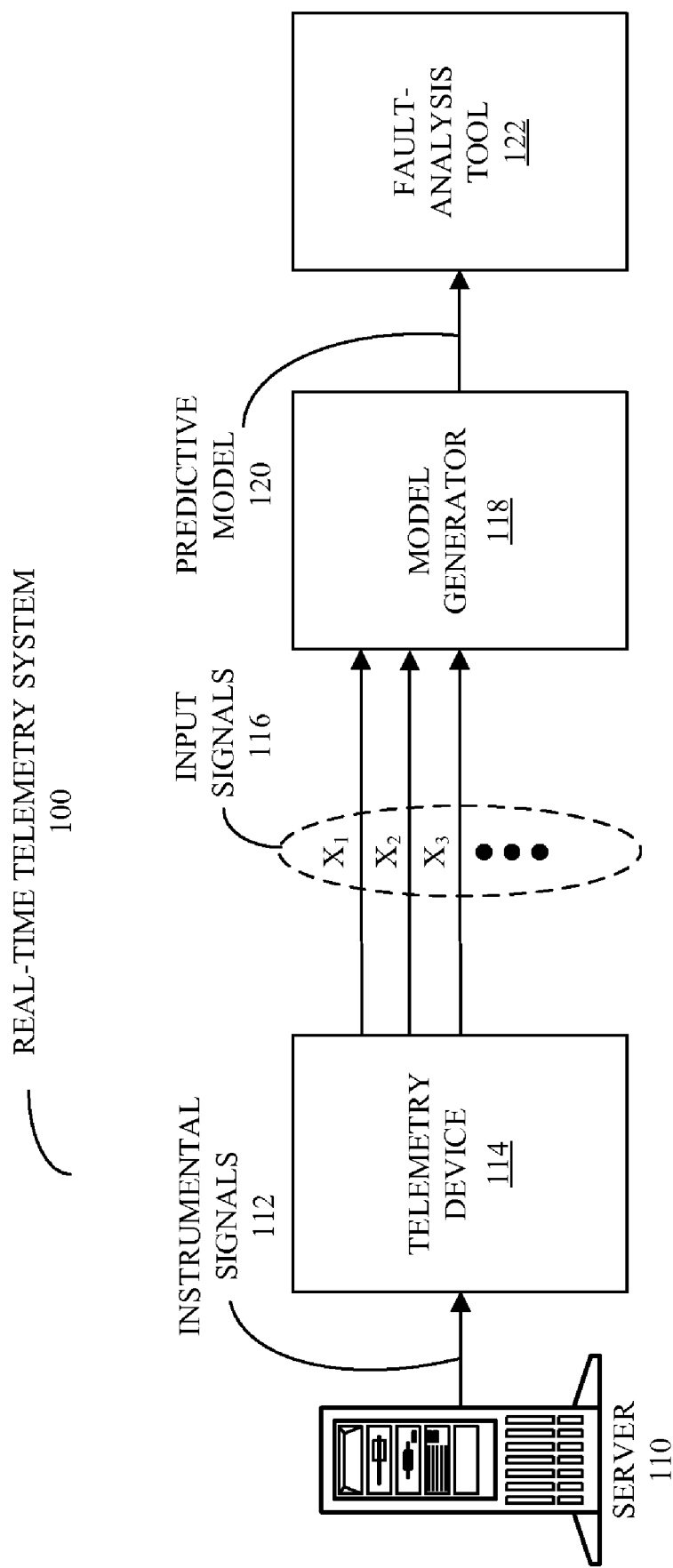
FIG. 1 is a block diagram illustrating a real-time telemetry system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method, and a computer program product (i.e., software) for use with the computer system are described. These systems and processes may be used to generate models that predict values of one or more signals. In particular, a given model may accurately, robustly, and with limited spillover predict values of a signal from a sensor based on other signals from other sensors, including signals that have significant quantization effects. These models may be used to detect impending problems in a computer system, such as during proactive fault monitoring.

In some embodiments, multiple models are generated to predict a value of the signal based on a set of quantized telemetry signals. A given one of these models produces a value of the signal using a subset of the set of quantized telemetry signals. This subset is selected from the set of quantized telemetry signals based on an objective criterion, such as: a robustness of the predicted value when degradation occurs in one or more sensors in the subset (e.g., how much a disturbance on one signal impacts the estimate for that signal); spillover, which determines how much a disturbance on a given signal included in the subset of the quantized telemetry signals used in the given model affects the predicted value of another signal; and/or an error (such as an root-mean-square error) between the predicted value and an actual value of the signal. Moreover, by aggregating the values produced by the multiple models, the value of the signal can be predicted. Note that deviations from this prediction can be used for fault monitoring.

In general, with the exception of the signal, the different models include different signals. While each of these models expresses an estimate for the signal, these estimates are based on different signals. Consequently, the estimates provided by these models will differ. However, when these estimates are aggregated together, the overall estimate is improved.

By assuming there are many signals under surveillance, and then creating different models by selecting different combinations of the monitored signals, this technique is able to successfully predict values of signals even when there are a very large number of correlated signals to work with (for example, many high-end servers have hundreds of signals, and some computer systems have more than 1000 signals). Moreover, this model-diversity technique yields very high sensitivity for detection of subtle anomalies even when the input signals are quantized due to low-resolution A/D chips, which is the case in all legacy computer systems presently in the field.

We now describe embodiments of a computer system, a method, and software for predicting a value of a signal from a sensor. FIG. 1 presents a block diagram illustrating an embodiment of a real-time telemetry system 100, which includes a server 110. This server can generally include any computational node including a mechanism for servicing requests from a client for computational and/or data-storage resources. In some embodiments, server 110 is a single processor or multi-processor server that is being monitored by real-time telemetry system 100.

Note that the present invention is not limited to server computer systems. In general, the present invention can be applied to any type of computer system, including, but is not limited to, a computer system based on a microprocessor, a mainframe computer, a digital signal processor, a portable computing device, a personal organizer, a device controller, and/or a computational engine within an appliance.

Real-time telemetry system 100 also contains telemetry device 114, which gathers instrumental signals 112 from the various sensors and monitoring tools within server 110, and directs the instrumental signals 112 to a remote location that contains model generator 118 and fault-analysis tool 122.

Note that instrumental signals 112 can include signals associated with physical performance parameters measured through sensors within a computer system, such as server 110. For example, the physical parameters can include: distributed temperatures within the computer system, relative humidity, cumulative or differential vibrations within the computer system, fan speed, acoustic signals, currents, voltages, time-domain reflectometry readings, and/or miscellaneous environmental variables.

Model generator 118 receives a set of input signals 116 from telemetry device 114, where each signal $X_i$ in the set of input signals 116 is distinctly associated with a distinct physical signal from server 110. Based on these signals, model generator 118 constructs multiple models to reflect the correlations among input signals 116, where the models are used to estimate the values of each signal in the set of input signals 116 as a function of subsets of the other signals in the set of input signals 116.

Model generator 118 additionally performs model selection and aggregation operations, which determine an optimal predictive model 120 for a given signal. Specifically, model generator 118 performs evaluations on all candidate models based on a set of rules and constraints. Model generator 118 also provides a computationally efficient approach for choosing an optimal subset of input signals 116 to be included in the optimal predictive model 120. More specifically, model generator 118 optimizes the predictive model 120 using a genetic technique, which is described in more detail below with reference to FIGS. 3-5.

Next, fault-analysis tool 122 uses the predictive model 120 during the monitoring phase to estimate a signal as a function of other input signals for proactive fault detection purposes. Significant deviations between the estimates and measured signal values can be used to detect a potential anomaly in the signal.

Note that in some embodiments real-time telemetry system 100 includes fewer or additional components. Moreover, two or more components may be combined into a single component and/or a position of one or more components may be changed.

Figure 2:
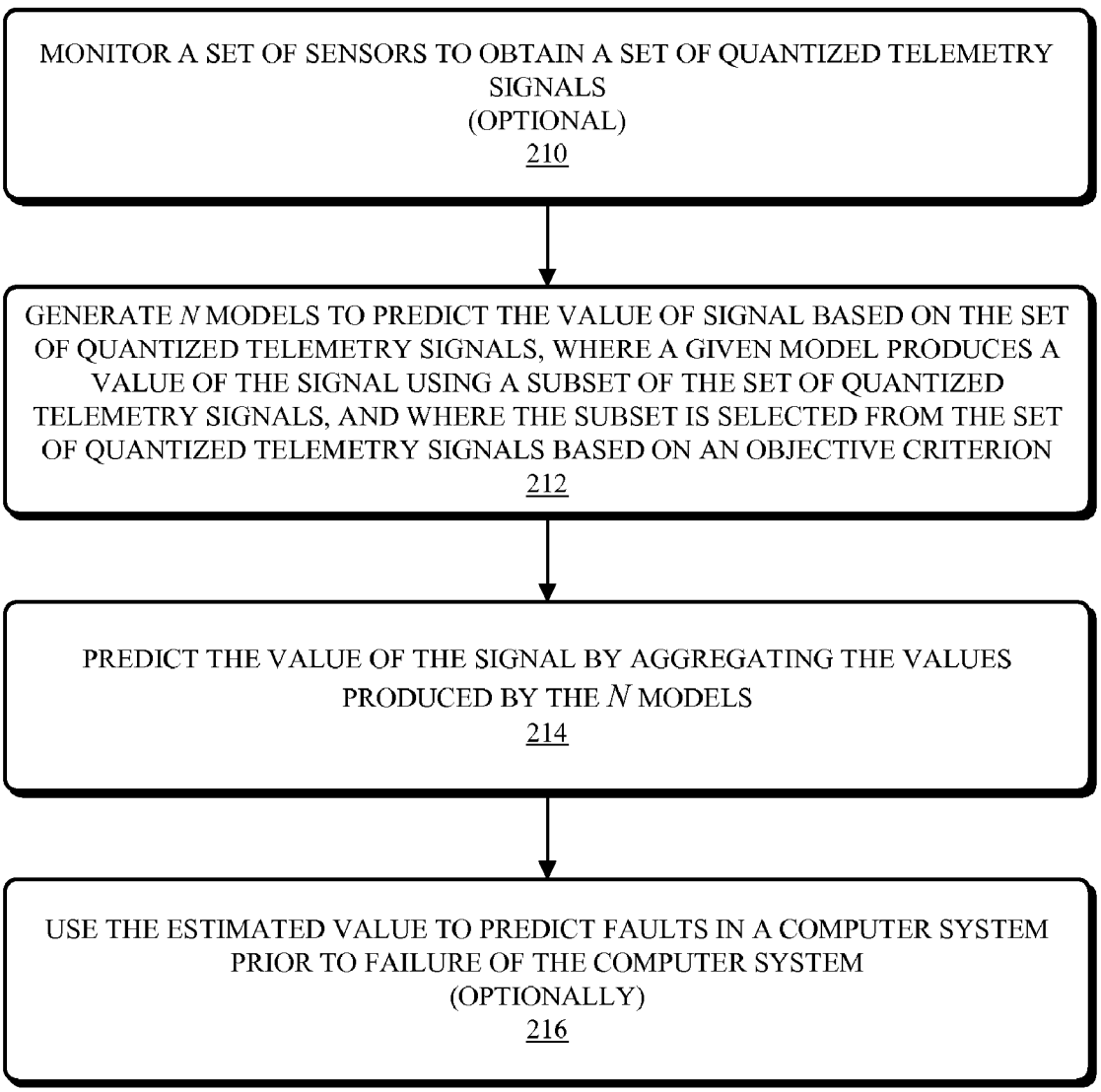
FIG. 2 is a flow chart illustrating a process for predicting a value of a signal from a sensor in accordance with an embodiment of the present invention.

We now discuss methods for predicting a value of a signal from a sensor. FIG. 2 presents a flow chart illustrating an embodiment of a process for predicting a value of a signal from a sensor, which may be implemented by a computer system, such as the real-time telemetry system 100 (FIG. 1). During operation, the computer system optionally monitors a set of sensors to obtain a set of quantized telemetry signals (210). Next, the computer system generates N models to predict the value of the signal based on the set of quantized telemetry signals (212), where a given model produces a value of the signal using a subset of the set of quantized telemetry signals, and where the subset is selected from the set of quantized telemetry signals based on an objective criterion. Then, the computer system predicts the value of the signal by aggregating the values produced by the N models (214).

In some embodiments, the computer system optionally uses the estimated value to predict faults in a given computer system (which can be the computer system or can be another computer system) prior to failure of the given computer system (216).

In typical applications of pattern recognition, one generally has a finite set of training data and a set of monitoring data for a set of signals $s_1, \ldots, s_m$. To detect degradation in monitoring data for a signal $s_i$, a model is built picking a subset of signals from the training data that are highly correlated to the signal $s_i$. Then, this model is used to calculate predictions for signal $s_i$ in the monitoring data. However, as noted previously, very often this conventional approach does not work well with quantized data. As described below, an alternate approach is used to significantly improve the prediction accuracy for proactive fault monitoring of quantized computer telemetry signals.

Figure 3:
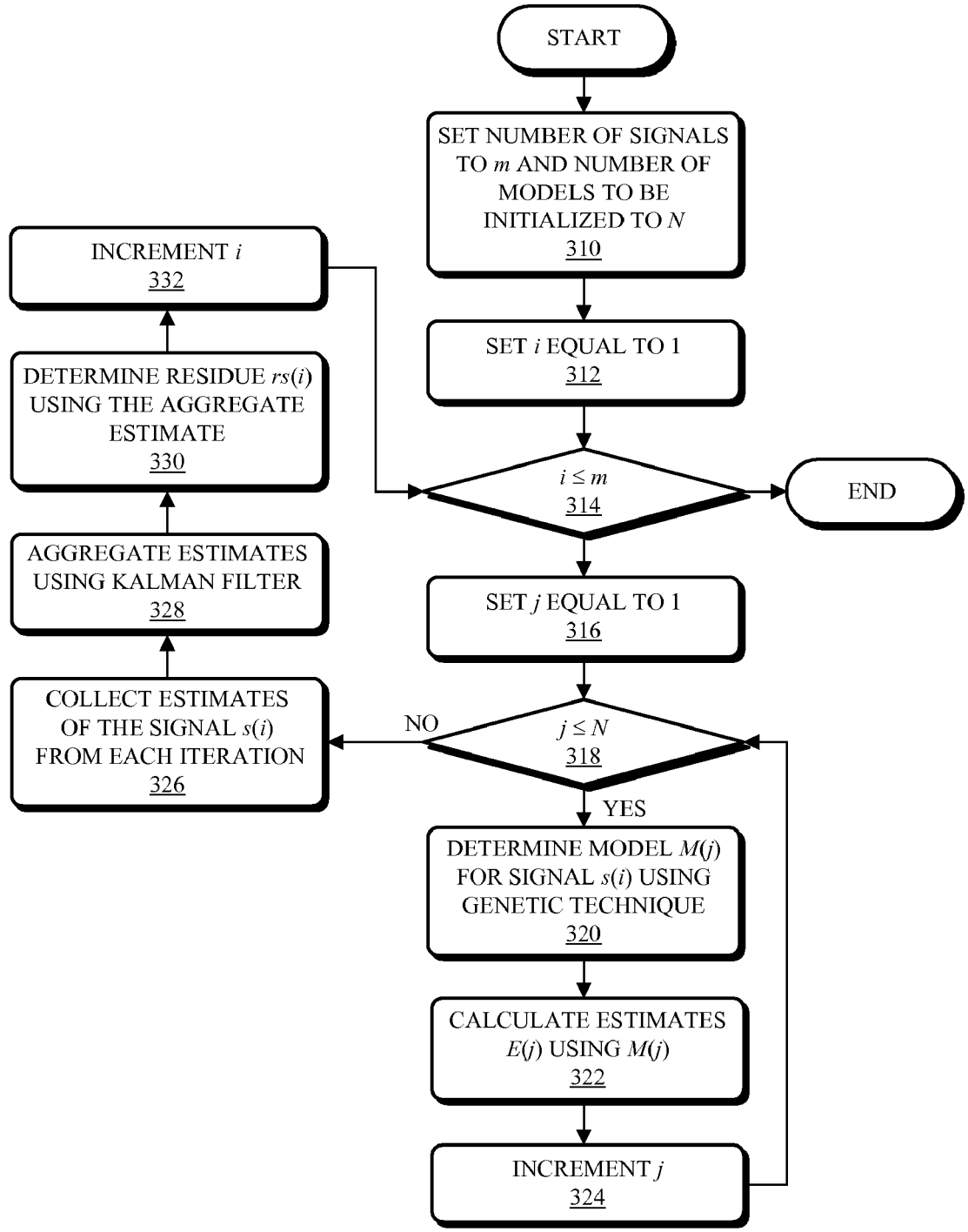
FIG. 3 is a flow chart illustrating a process for generating a model using the genetic technique in accordance with an embodiment of the present invention.

FIG. 3 presents a flow chart illustrating an embodiment of a process 300 for generating a model using the genetic technique, which may be implemented by a computer system, such as the real-time telemetry system 100 (FIG. 1). During operation, the computer system sets the number of quantized signals in the training data to m (i.e., $s_1, \ldots, s_m$) and the number of models to be constructed to N (310). Note that the quantized signals may each have common sampling times.

Next, the computer system sets a loop index i to 1 (312). As long as loop index i is less than or equal to m (314), the loop continues. If the loop index i exceeds m, the process terminates. In the loop, a dummy variable j is set to 1 (316). If the dummy variable j is less than or equal to N (318), a genetic technique is used to determine model M(j) of signal s(i) (320), i.e., the predicted variable in each model. Then, the computer system calculates an estimate E(j) of the signal s(i) using model M(j) (322) and increments the dummy variable j (324). Note that the genetic technique is described further below with reference to FIGS. 4-5.

Once the N models have been determined, the computer system collects estimates of the signal s(i) from each iteration (326) of the models during a monitoring phase. These estimates are then aggregated, for example, using a Kalman filter (328). In some embodiments, the aggregating of the values includes averaging the estimated values. Moreover, the estimated values may be weighted during the averaging based on the variance of the estimated values, with the model with the least variance being weighted the most, i.e., making the largest contribution to the aggregate model.

Next, the computer system uses the average estimate corresponding to the signal s(i) to calculate a residue rs(i) (330) (i.e., the estimation error), the loop index i is incremented (332), and the loop continues at operation 314.

It has been discovered empirically that when N independent models are used and the N corresponding output estimates are aggregated and averaged, the resulting prediction is much closer to the true value of the signal being monitored, in spite of the fact that the original signals used to generate the N models had poor resolution due to signal quantization effects. This is because the diverse models, which provide multiple estimates of same signal, overcome deficiencies in any one of the N models.

In an exemplary embodiment, the genetic technique was used to build 10 models in order to determine the drift in a Vcore signal. Note that the signals used to build these models were highly quantized, usually having only 2 or 3 distinct levels. Moreover, the residual or estimate error associated with an aggregation of the 10 Vcore signal estimates provided by these models was always small than the residual error associated with single-model estimates.

As the number of models N was increased, the residual sum of squares of the estimate error decreased until diminishing returns occurred at about 7 models. With 7 models, there is a 63% reduction in the residual sum of squares (relative to the single-model case). This reduction will significantly improve the sensitivity and false-alarm avoidance of proactive fault monitoring in legacy computing systems that possess quantized telemetry signals from low-resolution A/D chips. Consequently, when there are a large number of correlated signals to work with (such as for high-end servers), the technique described herein has much higher sensitivity for detecting subtle anomalies in quantized telemetry signals than has been heretofore possible with conventional nonlinear nonparametric-regression techniques.

We now described the genetic technique in more detail. In general, a genetic technique approximates an optimal solution to a problem through a process that mimics natural selection. During a selection operation, the fitness of candidate solutions is compared against each other through an objective function that depends on a set of variables. Next, two selected 'fit' solutions are 'combined' to produce an 'offspring' solution. The motivation for this operation is that if the two fit solutions are combined then the resulting solution can inherit the best traits of both of the 'parent' solutions, thereby producing the offspring solution that is even more fit than the parent solutions. Next, this process repeats, producing successively better solutions during each iteration.

Note that, in addition to combining two solutions to create a third one, there is typically a mutation operation that 'alters' a given solution, which mimics random mutations of a species in natural selection. With a specific set of rules and constraints, the genetic technique can quickly scan a vast solution set and search for an optimal solution. A more-detailed description of the genetic technique is found in John Holland's book, "*Adaptation in Natural and Artificial Systems*," University of Michigan Press, Ann Arbor, 1975.

Figure 4A:
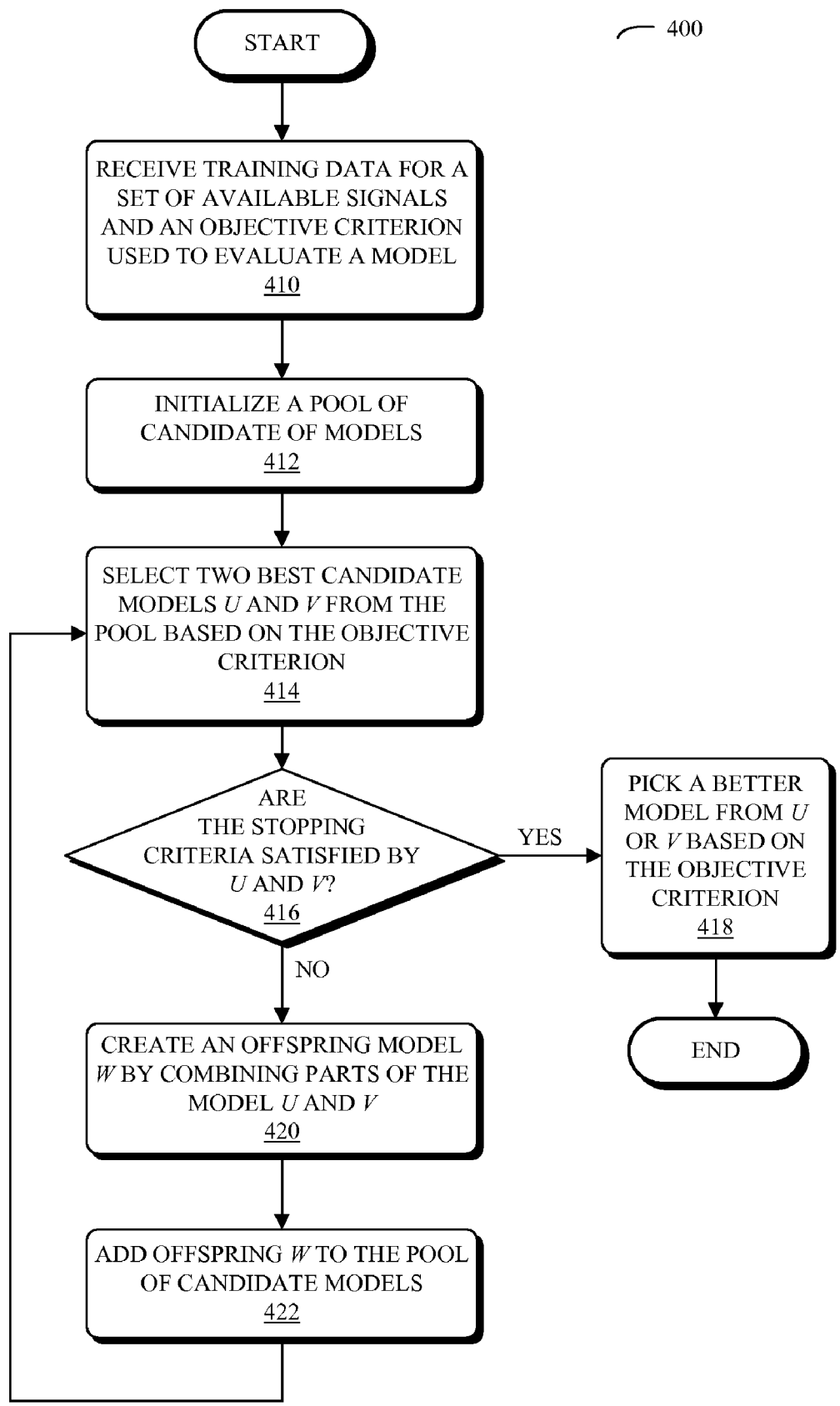
FIG. 4A is a flow chart illustrating a process for generating a model using the genetic technique in accordance with an embodiment of the present invention.

FIG. 4A presents a flow chart illustrating an embodiment of a process 400 for generating a model using the genetic technique, which may be implemented by a computer system, such as the real-time telemetry system 100 (FIG. 1). Note that the objective of this process is to select a subset of the available signals as input variables in the N models, and then to use these models to predict a value of a signal as a function of the input variables.

During operation, the computer system receives training data for the set of available signals from a computer system during normal fault-free operation and receives an objective criterion (or criteria) (410), which can be used to evaluate how well a given model predicts the signal. This objective criterion (or criteria) may include a set of performance metrics and constraints, which will be discussed in more detail below.

Next, the computer system initializes a pool of candidate models, which includes at least two candidate models in the initial pool (412). Note that each candidate model in the pool can include a randomly selected subset of all the available signals. More specifically, each candidate model in the pool may be represented using an n-bit binary string, where n is the total number of samples in the set of available signals, and where each bit in the n-bit binary string is associated with a corresponding sample in the set of available signals. In some embodiments of the present invention, the ith bit in the n-bit binary string is set to either 'one' if the ith signal in the set of available signals is included in the candidate regression model; or 'zero' if the ith signal in the set of available signals is not included in the candidate regression model. Typically, a poor candidate model in the initial pool does not affect the end solution because it will be discarded by a subsequent selection procedure.

Then, the computer system iteratively selects two candidate models U and V from the pool of candidate models (414). Specifically, the system selects models U and V that best predict the signal based on the training data and the objective criterion (or criteria).

Note that the computer system uses a set of stopping criteria to determine whether to terminate the iterative process at this point (416). In some embodiments, the set of stopping criteria can include a set of thresholds imposed on the objective criterion (or criteria) or simply a predetermined number of iterations. If the computer system determines that the stopping criteria are satisfied by the selected models U and V, then the computer system picks the better model from U or V based on the objective criterion (or criteria) (418), and subsequently terminates the optimization process.

Figure 4B:
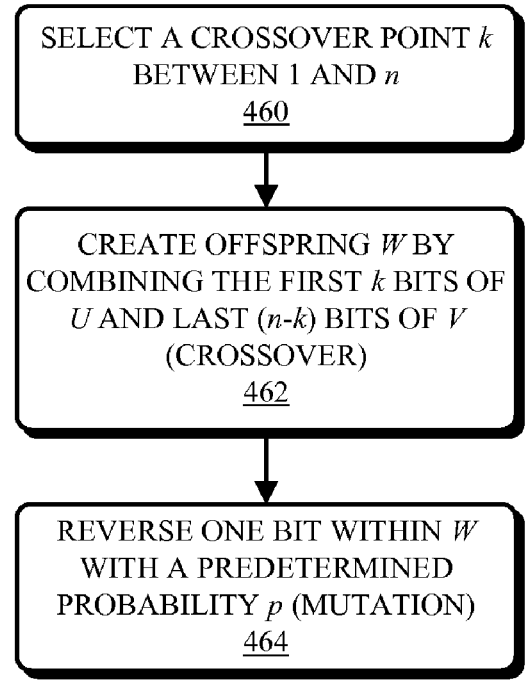
FIG. 4B is a flow chart illustrating a process for creating the offspring W by combining two candidate models U and V in accordance with an embodiment of the present invention.
Figure 5:
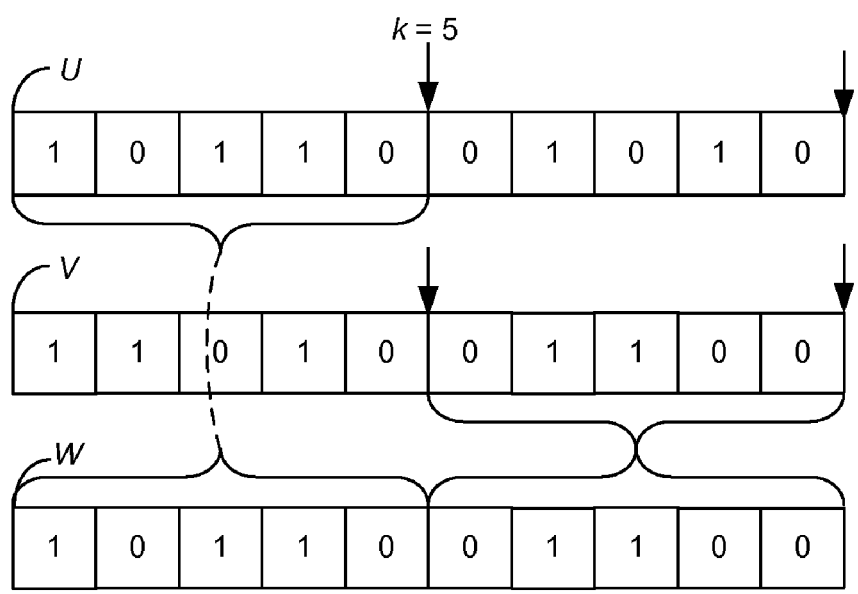
FIG. 5 illustrates an exemplary crossover operation to create offspring W from models U and V in accordance with an embodiment of the present invention.

Otherwise, as described further below with reference to FIGS. 4B and 5, the computer system uses the genetic technique to create an offspring model W from U and V by combining parts of the two selected models U and V (420). FIG. 4B presents a flow chart illustrating an embodiment of a process 450 for creating the offspring W by combining two candidate models U and V, which may be implemented by a computer system, such as the real-time telemetry system 100 (FIG. 1). During operation, the computer system first selects a crossover point k (for example, k may be randomly or pseudo-randomly selected), where k is an integer between 1 and n (460). Next, the computer system creates W by combining U and V such that the first k bits of W are the first k bits of U, and the last (n−k) bits of W are the last (n−k) bits of V (462). This process is referred to as 'crossover.' FIG. 5 presents an embodiment of an exemplary crossover operation to create offspring W from models U and V. Note that we select n=10 and k=5 in this example for simplicity.

Referring back to FIG. 4B, note that the crossover operation is not limited to the process described in operation 462. In some embodiments, a crossover operation includes two or more crossover points, which partition the n-bit binary string into three or more sections. In these embodiments, the computer system combines sections of the two candidate models to form the offspring W. For example, if two crossover points p and q (1<p<q<n) are selected, the offspring W may be created by combining first p bits of U, the middle (q−p) bits of V, and the last (n−q) bits of U.

After the crossover operation 462, the computer system reverses one bit within W with a predetermined probability p (464), which is typically referred to as a 'mutation.' Note that the probability p controls the 'mutation' probability in each iteration. Typically, the mutation occurs only occasionally in the offspring model W based on a value of p which is much less than one. Also note that reserving a specific bit in the model can have the effect of both adding and removing the input signal associated with the specific bit being flipped. For example, by reversing ith bit from 1 to 0, the corresponding ith input signal may be removed from the model.

Referring back to FIG. 4A, after creating the offspring model W, the computer system adds offspring model W to the pool of candidate models (422). Then, the computer system returns to operation 414 and repeats the cycle of operations 414-422. As the pool of candidate models grows larger, the models that are deemed as inferior may be marked and skipped for further examination, thereby saving computational time.

In some embodiments, the objective criterion (or criteria) is used to select the 'fittest' models from the pool. A weighted combination of a set of performance metrics and constraints may be used in formulating the objective criterion (or criteria), which is used to compare models against each other. These performance metrics and constraints can include but are not limited to:

Accuracy: measures how well the estimated values $\hat{u}_i$ for signal u by a given model agree with the measured values $u_i$ of signal u in the absence of faults. In some embodiments, the accuracy can be represented in the form of the mean-square error from m training observations of signal u as:

$$\frac{1}{m}\sum_{i=1}^{m} (\hat{u}_i - u_i)^2.$$

In these embodiments, a smaller value indicates a better model.

Robustness: measures the robustness of a given model with respect to disturbances appearing in signal u. We use $\hat{u}'_i$ to represent disturbed signal values predicted by a model, $\hat{u}'_i$ to represent disturbed signal values from measurements, and $\hat{u}_i$, $u_i$ to represent undisturbed signals from prediction and measurement, respectively. In some embodiments, the robustness can then be computed by:

$$\frac{1}{m}\sum_{i=1}^{m} \frac{\hat{u}'_i - \hat{u}_i}{u'_i - u_i}.$$

Again, in these embodiments, a smaller value indicates a better model, which suggests that the disturbance does not propagate through the model to the prediction results of the model.

Spillover: measures how much a disturbance on a signal u included in the candidate model affects the prediction results for the signal v generated by the candidate model. We use $\hat{v}'_i$ to represent disturbed signal values, $\hat{v}_i$ to represent undisturbed signal values predicted by the model, and $\hat{u}'_i$, $u_i$ to represent both disturbed and undisturbed signal u from measurement, respectively. In some embodiments, the robustness can then be computed by:

$$\frac{1}{m}\sum_{i=1}^{m} \frac{\hat{v}'_i - \hat{v}_i}{u'_i - u_i}.$$

Once again, in these embodiments of the spillover metric, a smaller value indicates a better model.

Number of signals in a given model: In some embodiments, the objective criterion (or criteria) is configured to minimize the number of signals included in the candidate model without significantly compromising other performance metrics and constraints.

Cross-correlation coefficients between quantized telemetry signals in the set of quantized telemetry signals.

Note that the above-described technique provides a computationally efficient approach for choosing the input signals to be included in a given model. Moreover, this technique avoids the well-known problem of 'combinatorial explosion,' which occurs when one attempts to try all possible combinations of available input signals and seek an optimal combination via conventional constrained optimization. Also note that the model generated through the technique is near optimal in the sense that its performance exceeds nearly every other possible model that can be constructed from the same set of available input signals.

Note that in some embodiments of processes 200 (FIG. 2), 300 (FIG. 3A), 350 (FIG. 3B), 400 (FIG. 4A) and/or 450 (FIG. 4B) there may be additional or fewer operations. Moreover, the order of the operations may be changed, and two or more operations may be combined into a single operation.

Figure 6:
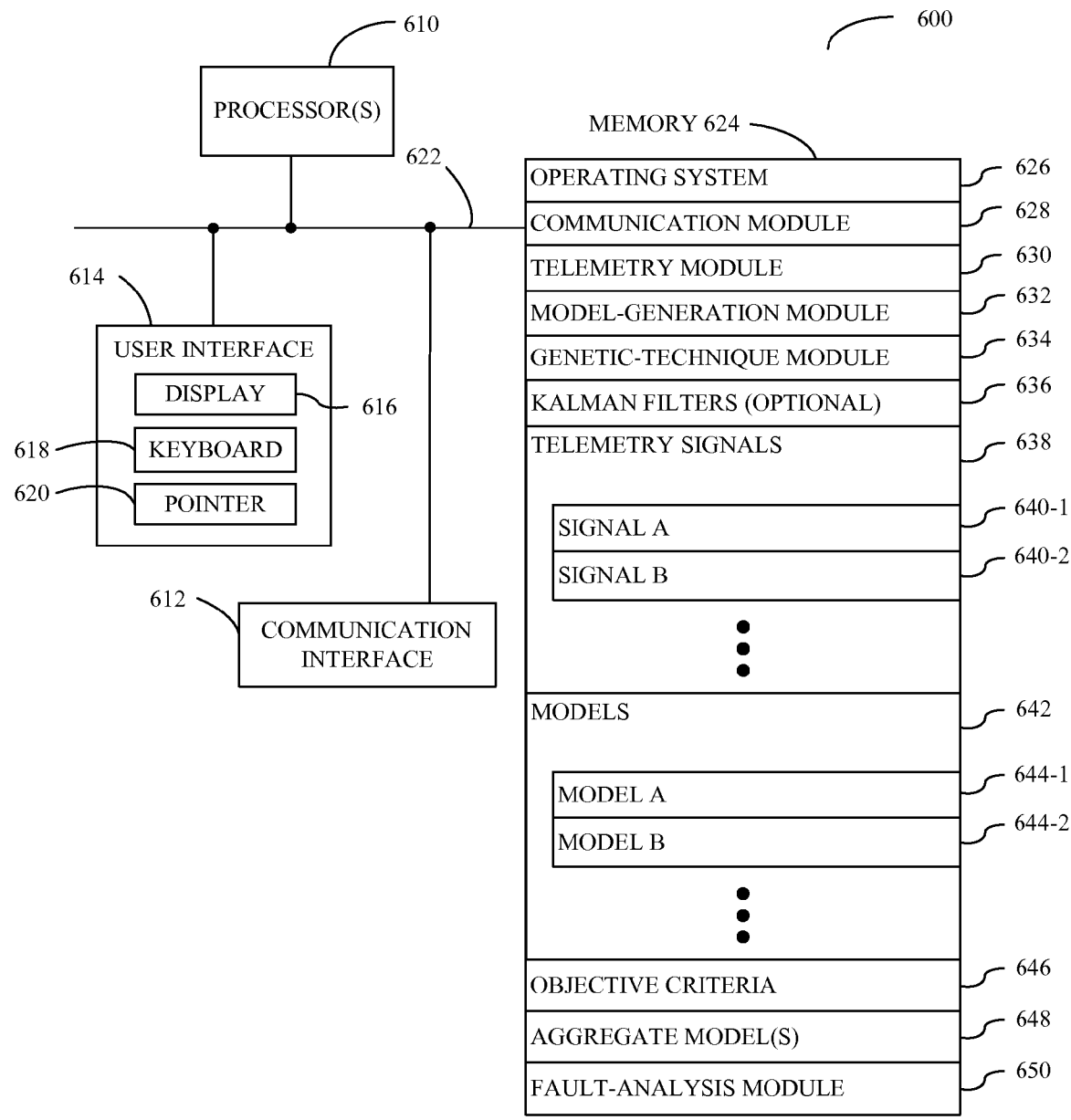
FIG. 6 is a block diagram illustrating a computer system in accordance with an embodiment of the present invention.

FIG. 6 presents a block diagram illustrating an embodiment of a computer system 600, such as the real-time telemetry system 100 (FIG. 1). Computer system 600 includes one or more processors (or processor cores) 610, a communication interface 612, a user interface 614, and one or more signal lines 622 coupling these components together. Note that the one or more processors 610 may support parallel processing and/or multi-threaded operation, the communication interface 612 may have a persistent communication connection, and the one or more signal lines 622 may constitute a communication bus. Moreover, the user interface 614 may include a display 616, a keyboard 618, and/or a pointer 620, such as a mouse.

Memory 624 in the computer system 600 may include volatile memory and/or non-volatile memory. More specifically, memory 624 may include: ROM, RAM, EPROM, EEPROM, flash, one or more smart cards, one or more magnetic disc storage devices, and/or one or more optical storage devices. Memory 624 may store an operating system 626 that includes procedures (or a set of instructions) for handling various basic system services for performing hardware dependent tasks. Moreover, memory 624 may also store communications procedures (or a set of instructions) in a communication module 628. These communication procedures may be used for communicating with one or more computers, devices and/or servers, including computers, devices and/or servers that are remotely located with respect to the computer system 600.

Memory 624 may also include one or more program modules (or a set of instructions), including telemetry module 630 (or a set of instructions), model-generation module 632 (or a set of instructions), genetic-technique module 634 (or a set of instructions), and/or fault-analysis module 650 (or a set of instructions). Telemetry module 630 may store signals from sensors, such as signal A 640-1 and signal B 640-2, with telemetry signals 638.

Moreover, model-generation module 632 may generate models 642, such as model A 644-1 and model B 644-2, using genetic-technique module 634. Each of these models may be based on a subset of the telemetry signals 638. For example, the subsets may be selected based on one or more objective criteria 646. Additionally, models 642 may be aggregated using optional Kalman filters 636 to create aggregate models 648. These aggregate models may be used by fault-analysis module 650 during proactive fault monitoring.

Instructions in the various modules in the memory 624 may be implemented in a high-level procedural language, an object-oriented programming language, and/or in an assembly or machine language. The programming language may be compiled or interpreted, i.e., configurable or configured to be executed by the one or more processors 610.

Although the computer system 600 is illustrated as having a number of discrete components, FIG. 6 is intended to be a functional description of the various features that may be present in the computer system 600 rather than as a structural schematic of the embodiments described herein. In practice, and as recognized by those of ordinary skill in the art, the functions of the computer system 600 may be distributed over a large number of servers or computers, with various groups of the servers or computers performing particular subsets of the functions. In some embodiments, some or all of the functionality of the computer system 600 may be implemented in one or more ASICs and/or one or more digital signal processors DSPs.

Computer system 600 may include fewer components or additional components. Moreover, two or more components may be combined into a single component and/or a position of one or more components may be changed. In some embodiments the functionality of computer system 600 may be implemented more in hardware and less in software, or less in hardware and more in software, as is known in the art.

Figure 7:
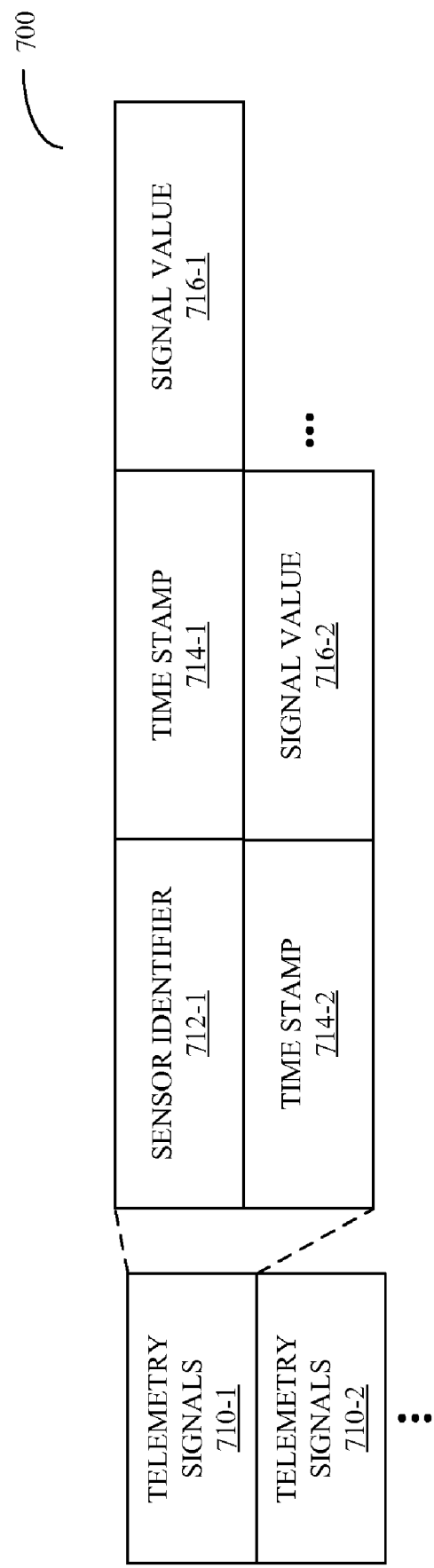
FIG. 7 is a block diagram illustrating a data structure in accordance with an embodiment of the present invention.

We now discuss data structures that may be used in real-time telemetry system 100 (FIG. 1) and/or computer system 600 (FIG. 6). FIG. 7 presents a block diagram illustrating an embodiment of a data structure. This data structure may include telemetry signals 710. More specifically, a given instance of the telemetry signals 710, such as telemetry signals 710-1, may include: a sensor identifier 712-1, and multiple instances of time stamps 714 and associated signal values 716. Note that that in some embodiments of the data structure 700 there may be fewer or additional components. Moreover, two or more components may be combined into a single component, and/or a position of one or more components may be changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for predicting a value of a signal from a sensor, comprising:
    generating N models to predict the value of the signal based on a set of quantized telemetry signals, wherein a given model produces a value of the signal using a subset of the set of quantized telemetry signals, and wherein the subset is selected from the set of quantized telemetry signals based on an objective criterion; and
    predicting the value of the signal by aggregating the values produced by the N models.

2. The method of claim 1, wherein the objective criterion accounts for a robustness of the predicted value when degradation occurs in one or more sensors in the subset.

3. The method of claim 1, wherein the objective criterion accounts for spillover, which determines how much a disturbance on a given signal included in the subset of the quantized telemetry signals used in the given model affects the predicted value of the signal.

4. The method of claim 1, wherein the objective criterion includes an error between the predicted value and an actual value of the signal.

5. The method of claim 4, wherein the error includes a mean-square error.

6. The method of claim 1, wherein the objective criterion includes cross-correlation coefficients between the quantized telemetry signals.

7. The method of claim 1, wherein the aggregating of the values includes averaging the values.

8. The method of claim 7, wherein, during the averaging, the values are weighted based on the variance of the values.

9. The method of claim 8, wherein the weighting is determined using a Kalman filter.

10. The method of claim 1, wherein generating the given model includes:
    initializing a pool of candidate models which include at least two candidate models, wherein each candidate model in the pool includes a subset of the set of quantized telemetry signals; and
    optimizing the given model by iteratively,
    selecting two models U and V from the pool of candidate models, wherein models U and V best predict the signal based on training data in the set of quantized telemetry signals and the objective criterion;
    using a genetic technique to create an offspring model W from U and V by combining parts of the two models U and V; and
    adding W to the pool of candidate models.

11. The method of claim 10, wherein each candidate model in the pool is represented using an n-bit binary string; and
    wherein creating the offspring model W from U and V involves:
    selecting a crossover point k, wherein k is an integer between 1 and n;
    creating W by combining U and V such that the first k bits of W are the first k bits of U, and the last (n−k) bits of W are the last (n−k) bits of V; and
    reversing one bit within W with a predetermined probability p.

12. The method of claim 11, wherein k is randomly or pseudo-randomly selected.

13. The method of claim 1, further comprising using the estimated value to predict faults in a computer system prior to failure of the computer system.

14. The method of claim 1, further comprising monitoring a set of sensors to obtain the quantized telemetry signals.

15. A computer program product for use in conjunction with a computer system, the computer program product comprising a computer-readable storage medium and a computer-program mechanism embedded therein for predicting a value of a signal from a sensor, the computer-program mechanism including:
    instructions for generating N models to predict the value of the signal based on a set of quantized telemetry signals, wherein a given model produces a value of the signal using a subset of the set of quantized telemetry signals, and wherein the subset is selected from the set of quantized telemetry signals based on an objective criterion; and
    instructions for predicting the value of the signal by aggregating the values produced by the N models.

16. The computer-program product of claim 15, wherein, during the averaging, the values are weighted based on the variance of the values.

17. The computer-program product of claim 16, wherein the weighting is determined using a Kalman filter.

18. The computer-program product of claim 15, wherein generating the given model includes:
    initializing a pool of candidate models which include at least two candidate models, wherein each candidate model in the pool includes a subset of the set of quantized telemetry signals; and
    optimizing the given model by iteratively,
    selecting two models U and V from the pool of candidate models, wherein models U and V best predict the signal based on training data in the set of quantized telemetry signals and the objective criterion;

using a genetic technique to create an offspring model W from U and V by combining parts of the two models U and V; and adding W to the pool of candidate models.

19. The computer-program product of claim 18, wherein each candidate model in the pool is represented using an n-bit binary string; and wherein creating the offspring model W from U and V involves:

selecting a crossover point k, wherein k is an integer between 1 and n;

creating W by combining U and V such that the first k bits of W are the first k bits of U, and the last (n−k) bits of W are the last (n−k) bits of V; and reversing one bit within W with a predetermined probability p.

20. An apparatus, comprising:

a set of sensors configured to produce quantized telemetry signals;

a processor;

memory configured to store the quantized telemetry signals produced by the set of sensors; and a program module, wherein the program module is stored in the memory and configured to be executed by the processor, the program module including:

instructions for generating N models to predict a value of a signal based on the set of quantized telemetry signals, wherein a given model produces a value of the signal using a subset of the set of quantized telemetry signals, and wherein the subset is selected from the set of quantized telemetry signals based on an objective criterion; and instructions for predicting the value of the signal by aggregating the values produced by the N models.

* * * * *